United States Patent
Savitskyy et al.

(10) Patent No.: US 10,095,347 B2
(45) Date of Patent: Oct. 9, 2018

(54) PASSIVE STYLUS AND GRIP SHADOW RECOGNITION

(71) Applicant: Wacom Co., Ltd., Saitama (JP)

(72) Inventors: Oleksiy Savitskyy, Busk (UA); Oleksandr Karpin, Lviv (UA); Igor Kravets, Lviv (UA)

(73) Assignee: Wacom Co., Ltd., Saitama (JP)

( * ) Notice: Subject to any disclaimer, the term of this patent is extended or adjusted under 35 U.S.C. 154(b) by 26 days.

(21) Appl. No.: 15/233,713

(22) Filed: Aug. 10, 2016

(65) Prior Publication Data

US 2017/0060273 A1    Mar. 2, 2017

Related U.S. Application Data

(60) Provisional application No. 62/211,587, filed on Aug. 28, 2015.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ................................ G06F 3/0416; G06F 3/044
See application file for complete search history.

(56) References Cited

U.S. PATENT DOCUMENTS

| | | | | |
|---|---|---|---|---|
| 9,684,409 B2* | 6/2017 | Hills | ...................... | G06F 3/0416 |
| 2013/0106731 A1* | 5/2013 | Yilmaz | ................. | G06F 3/0346 345/173 |
| 2014/0354583 A1* | 12/2014 | Tokutake | .............. | G06F 3/0488 345/174 |
| 2015/0103043 A1* | 4/2015 | Hills | ........................ | G06F 3/044 345/174 |
| 2016/0077625 A1* | 3/2016 | Soo | ......................... | G06F 3/044 345/174 |
| 2017/0153763 A1* | 6/2017 | Vavra | ..................... | G06F 3/0488 |

* cited by examiner

*Primary Examiner* — Ryan A Lubit
(74) *Attorney, Agent, or Firm* — Seed IP Law Group LLP

(57) ABSTRACT

Various embodiments provide an object recognition process that is configured to detect a passive stylus and reject non-passive stylus objects on a touch screen, including an edge portion of the touch screen. In one embodiment, the object recognition process includes receiving sense signals from sense elements of a sense array in response to a touch object being on the sense array, selecting three sense signals from three respective sense elements, calculating a first sum of the strengths of the three selected signals, calculating a second sum of the strengths of two of the selected signals which are greater than the strength of one of the selected signals; and determining a type of the object (e.g., a passive stylus or a user hand's grip shadow) based on the first sum and the second sum.

6 Claims, 6 Drawing Sheets

PASSIVE STYLUS AND GRIP SHADOW RECOGNITION

CROSS-REFERENCE TO RELATED APPLICATIONS

This application claims the benefit of U.S. Provisional Application No. 62/211,587 filed on Aug. 28, 2015, the contents of which are hereby incorporated by reference herein.

BACKGROUND

Technical Field

This disclosure relates to the field of object recognition for user interface devices.

Description of the Related Art

Touch screens may utilize a variety of different sensor technologies, such as resistive, capacitive, inductive, and radio frequency sensor arrays. Resistive touch screens, in particular, are well suited for use with passive styluses, as resistive touch screens are able to sense an input from nearly any object. However, resistive touch screens are limited in regard to sensing multiple objects at the same time. For example, multi-touch (i.e., applying two or more objects to the touch screen simultaneously) is generally not supported by resistive touch screens. Due to this and other limitations, other types of touch screens, such as capacitive touch screens, are increasingly replacing resistive touch screens in the consumer marketplace.

One of the major challenges for touch screens that support multi-touch is object recognition. Current touch screens have difficulty distinguishing between a user's hand, such as a palm or finger, and a passive stylus. Proper object recognition is important in order to execute respective procedures for different types of touch objects.

Object recognition is particularly important along edges of a touch screen as the edges are often subject to inadvertent contact. For example, when a user holds a touch screen device, such as a phone or a tablet, the user's palm or finger will often incidentally contact an edge of the touch screen and cause a false detection of a passive stylus. The incidental contact of the user's hand on the touch screen is sometimes referred to as grip shadow. Unfortunately, differentiating between a user's hand and a passive stylus along an edge of a capacitive touch screen is often difficult, as sensing data along edges is typically minimal.

BRIEF SUMMARY

The present disclosure is directed to an object recognition process for a touch screen that is configured to detect a passive stylus and reject non-passive stylus objects (e.g., a user's hand) on a touch screen, including an edge portion of the touch screen.

According to one embodiment, the object recognition process includes, in part, receiving sense signals from sense elements of a sense array in response to a touch object being on the sense array, and selecting three sense signals of the received sense signals from three respective sense elements. In the same or another embodiment, one of the three sense signals selected is the largest sense signal, or maxima, of the received sense signals. In the same or another embodiment, the three sense signals are selected based on the physical position of their corresponding sense elements.

The object recognition process then determines whether certain passive stylus conditions are satisfied, to detect whether the touch object on the sense array is a passive stylus or not. The passive stylus conditions include determining whether a sum of the strengths of the selected signals is within a passive stylus strength range, determining whether the sum of the strengths of the selected signals is less than a passive stylus threshold, and determining whether the touch object is positioned in a center of one of the sense elements corresponding to the selected signals based on a partial sum of the strengths of the selected signals.

In one embodiment, an object sensor is provided, which includes reception circuitry that receives at least three signals respectively corresponding to at least three positions indicated by an object on a sensor surface. The object sensor includes a processor coupled to the reception circuitry which, in operation, calculates a first sum of signal strengths of the at least three signals; calculates a second sum of signal strengths of at least two of the at least three signals which are greater than signal strength(s) of the rest of the at least three signals; and determines a type of the object based on the first sum and the second sum.

In one embodiment, an object sensing method is provided. The method includes receiving at least three signals respectively corresponding to at least three positions indicated by an object on a sensor surface; calculating a first sum of signal values of the at least three signals; calculating a second sum of signal values of at least two of the at least three signals which are greater than signal value(s) of the rest of the at least three signals; and determining a type of the object based on the first sum and the second sum.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description. Thus, the specific details set forth are merely exemplary. Particular implementations may vary from these exemplary details and still be contemplated to be within the scope of the present invention. Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
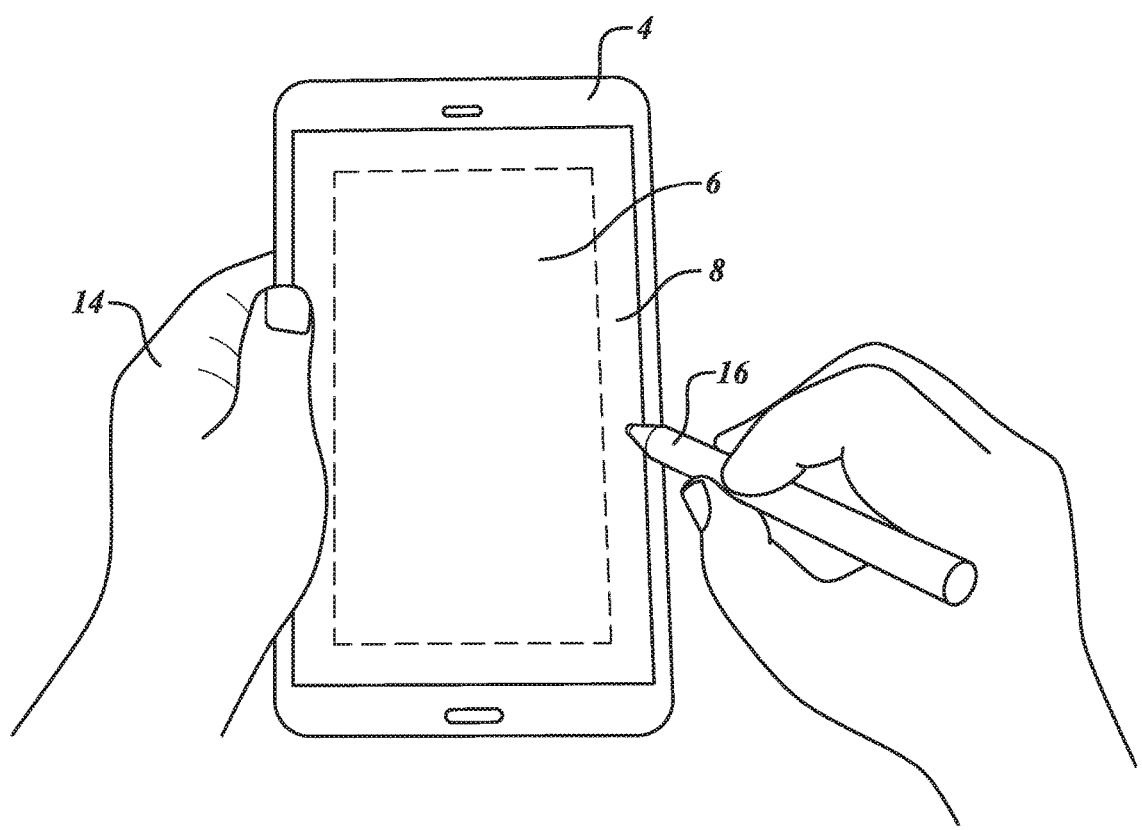
FIG. 1 is a diagram illustrating an example of a user holding an electronic device having a touch screen according to embodiments disclosed herein.

FIG. 1 is an example of a user holding an electronic device 4 having a touch screen 6 according to one embodiment. The touch screen 6 is configured to detect a presence of a touch object, such as a user's hand 14 and a passive stylus 16. As shown in FIG. 1, when the user holds the electronic device 4, the user's hand 14 may incidentally contact an edge portion 8 of the touch screen 6. As will be discussed in further detail below, the electronic device 4 is configured to distinguish between a user's hand and the passive stylus 16 on the touch screen 6, including within the edge portion 8.

The edge portion 8 may be any size and have a variety of different arrangements. For example, the edge portion 8 may extend 5 mm to 10 mm from all the edges of the touch screen 6, the edge portion 8 may be defined to be portions of the touch screen 6 that are along the vertical edges of the electronic device, or the edge portion 8 may be defined to be portions of the touch screen 6 that are along the horizontal edges of the electronic device.

The electronic device 4 is shown for illustrative purposes. The electronic device 4 may be any type of electronic device that utilizes a touch screen. For example, the electronic device 4 may be a tablet computer, a notebook computer, a mobile handset, a personal data assistant (PDA), a keyboard, a television, a remote control, a monitor, a handheld multimedia device, a handheld media (audio and/or video) player, a handheld gaming device, a signature input device for point of sale transactions, an eBook reader, a smart phone, a global position system (GPS) device, or a control panel.

Figure 2:
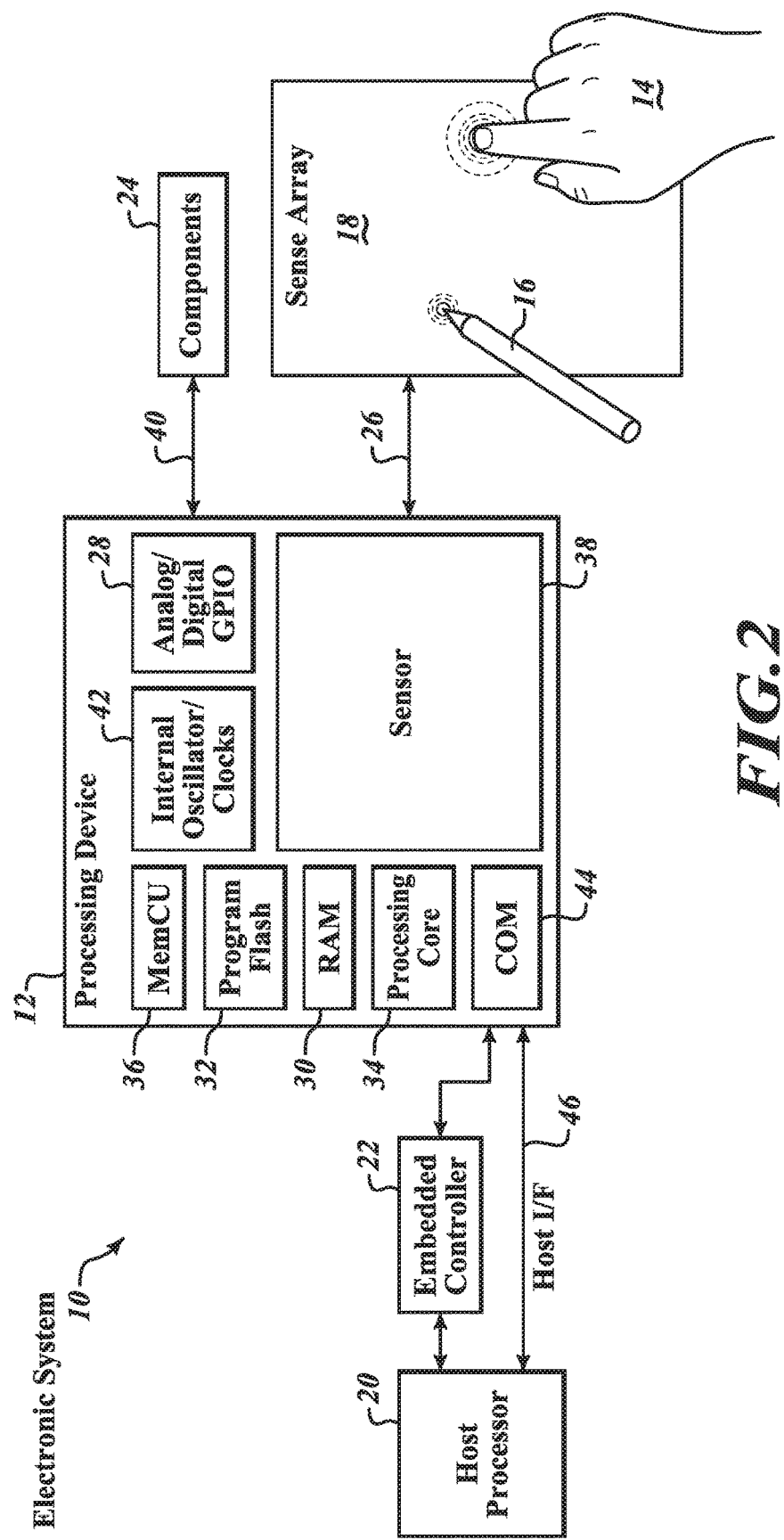
FIG. 2 is a block diagram illustrating an example of an electronic system of an electronic device having a touch screen according to embodiments disclosed herein.

FIG. 2 is a block diagram illustrating an example of an electronic system 10 of the electronic device 4 according to one embodiment. The electronic system 10 includes a sense array 18, a processing device 12, a host processor 20, an embedded controller 22, and components 24.

The sense array 18 is coupled to the processing device 12 via a bus 26. The sense array 18 is a multi-dimension sense array that includes multiple sense elements organized in a plurality of rows and columns. Each of the sense elements is configured to generate a sense signal proportional to the amount of contact a touch object has with the sense element. Accordingly, the sense signals generated by the sense elements may be used to determine a position of a touch object on the sense array 18. In one embodiment, the sense signals generated from the sense elements are electrical signals, such as capacitance signals, voltage signals, or current signals.

The sense array 18 may be any type of sensor array configured to detect multiple types of touch objects, such as the user's hand 14 or the passive stylus 16. In one embodiment, the sense array 18 is a capacitive sensor array that includes a first plurality of electrodes arranged in rows, and a second plurality of electrodes positioned over the first plurality of electrodes and arranged in columns. Each of the intersections of the first plurality of electrodes and the second plurality of electrodes corresponds to a sense element. Each of the electrodes may be configured as transmitter (TX) or receiver (RX) electrodes in any chosen combination.

In one embodiment, the sense array 18 is transparent and is disposed on, in, or under either a visual display (e.g., an LCD monitor) of the touch screen 6 or a transparent substrate (e.g., glass) in front of the visual display.

The processing device 12 is configured to detect a touch object, such as the user's hand 14 and the passive stylus 16, on the sense array 18. The processing device 12 may detect and track a touch object on the sense array 18 individually or concurrently. The processing device 12 includes analog and/or digital general purpose input/output (GPIO) ports 28, memory including a random access memory (RAM) 30 and a program flash 32, a processing core 34, a memory controller unit (MemCU) 36, a sensor 38, internal oscillator/clocks 42, and a communication block 44.

The GPIO ports 28 provide inputs and outputs for the processing device 12. In one embodiment, the GPIO ports 28 are programmable. For example, the GPIO ports 28 may be coupled to a Programmable Interconnect and Logic ("PIL"), which acts as an interconnect between the GPIO ports 28 and a digital block array of the processing device 12. The digital block array may be configured to implement a variety of digital logic circuits (e.g., DACs, digital filters, or digital control systems) using, in one embodiment, configurable user modules ("UMs"). The digital block array may be coupled to a system bus.

The memory is configured to store a computer program, or firmware, for controlling algorithms to implement operations described herein. In one embodiment, the memory stores a computer program configured to perform a touch object recognition process 48, which will be discussed in further detail with respect to FIG. 3. The memory includes the RAM 30 and the program flash 32. The RAM 30 may be static RAM ("SRAM"), and the program flash 32 may be a non-volatile storage.

The processing core 34 is configured to execute the computer program stored in the memory to implement operations described herein.

The MemCU 36 is coupled to the memory and the processing core 34. The MemCU is configured to manage data between the memory and the processing core 34.

The sensor 38 is configured to measure sense signals from the sense elements of the sense array 18. The sensor 38 may operate using a charge accumulation circuit, a capacitance modulation circuit, or any other capacitance sensing circuits. The sensor 38 includes an analog I/O for coupling to an external component, such as the sense array 18, a touch-sensor slider, and touch-sensor buttons.

The sensor 38 may utilize a variety of techniques to detect objects on the sense array 18.

In one embodiment, the sense array 18 operates as a mutual capacitive sense array to detect touch objects on the sense array 18. In this embodiment, when an object touches the sense array 18, the object causes a decrease in capacitance affecting some of the electrodes. Thus, the location of the object may be determined by identifying both the RX electrode having a decreased coupling capacitance between the RX electrode and the TX electrode in which the TX signal was applied at the time the decreased capacitance was measured on the RX electrode. Accordingly, by sequentially determining capacitances associated with the intersection of electrodes, the locations of one or more inputs may be determined. It should be noted that interpolation may be used to detect objects at better resolutions than the row/column pitch. In addition, various types of algorithms (e.g., approximation algorithms, interpolation algorithms, centroid algorithms) may be used to detect the center of touch objects.

In the same or another embodiment, the sense array 18 is configured to operate as a coupled-charge receiver to detect an active stylus. In this embodiment, the active stylus, which generates a stylus TX signal when activated, is used to couple charge to the sense array 18. The sensor 38 then measures a charge that is capacitively coupled between the sense array 18 and the active stylus. The capacitance associated with an intersection between a TX electrode and an RX electrode may be sensed by selecting every available combination of TX electrode and RX electrode.

The sensor 38 may be integrated into the same integrated circuit (IC) as the processing device 12 or in a separate IC. Alternatively, descriptions of the sensor 38 may be generated and compiled for incorporation into other integrated circuits. For example, behavioral level code describing the sensor 38, or portions thereof, may be generated using a hardware descriptive language, such as VHDL or Verilog, and stored to a machine-accessible medium (e.g., CD-ROM, hard disk, floppy disk, etc.). Furthermore, the behavioral level code may be compiled into register transfer level ("RTL") code, a netlist, or even a circuit layout, and stored to a machine-accessible medium. The behavioral level code, the RTL code, the netlist, and the circuit layout may represent various levels of abstraction to describe sensor 38.

The oscillator/clocks 42 provide clock signals to one or more of the components of the processing device 12. In another embodiment, the processing device 12 includes a spread spectrum clock.

The communication block 44 is configured to communicate with external components, such as the host processor 20, via a host interface ("I/F") line 46 to send and receive data. In the same or another embodiment, the processing device 12 is coupled to the embedded controller 22 to communicate with external components, such as the host processor 20.

In one embodiment, the processing device 12 resides on a common carrier substrate, such as an IC die substrate and a multi-chip module substrate. In another embodiment, the components of the processing device 12 are on one or more separate integrated circuits and/or are discrete components.

Although not shown in FIG. 1, the processing device 12 may also include an analog block array coupled to the system bus. The analog block array is configured to implement a variety of analog circuits (e.g., ADCs or analog filters) using, in one embodiment, configurable UMs. In one embodiment, the analog block array is coupled to the GPIO ports 28.

The components 24 are coupled to the processing device 12 via bus 40 and the GPIO port 28. The components 24 may include buttons, light-emitting diodes ("LEDs"), and other user interface devices, such as a mouse and a keyboard. In one embodiment, the buses 26 and 40 are combined into a single bus.

Figure 3:
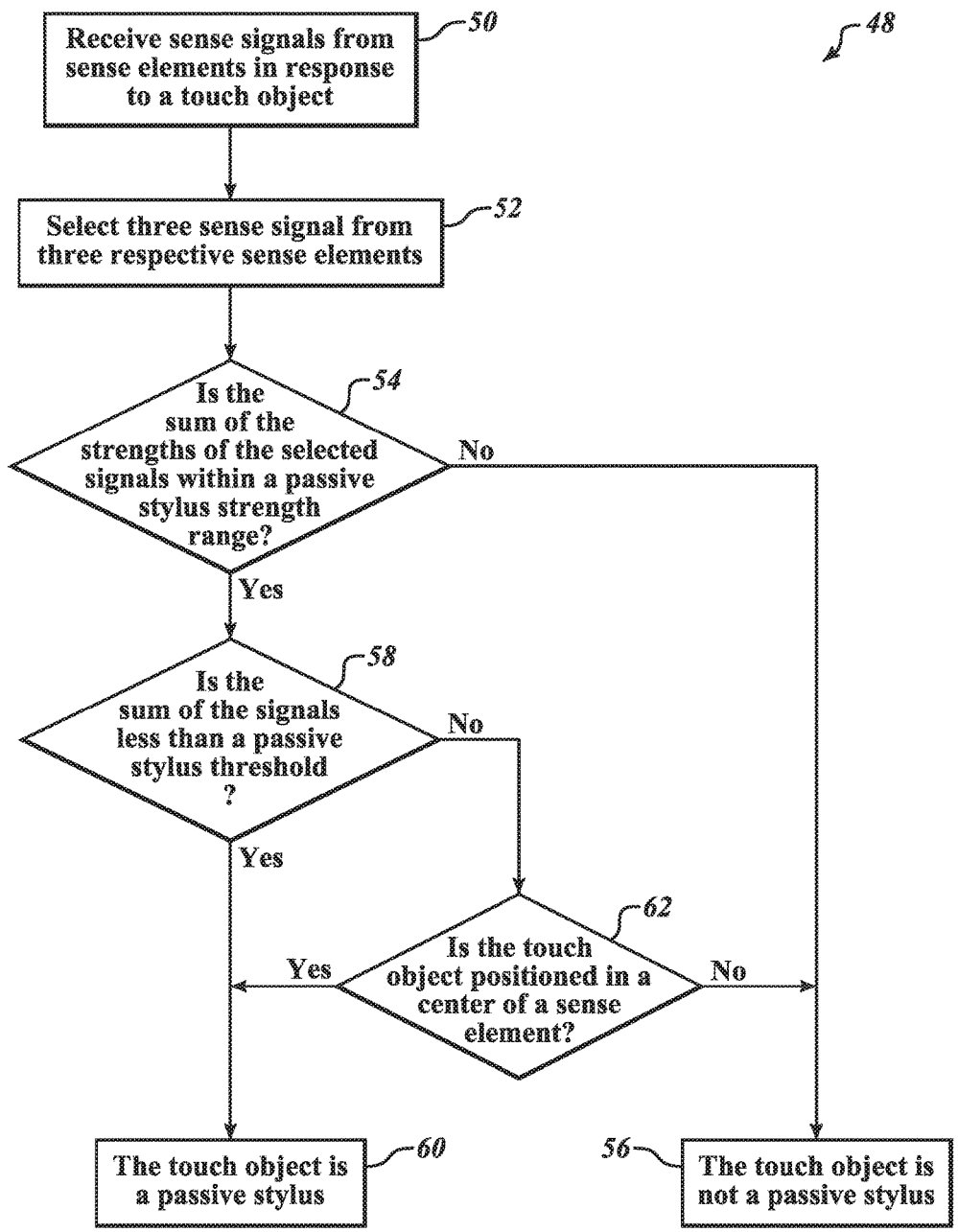
FIG. 3 is a flow diagram illustrating an example of a touch object recognition process according to embodiments disclosed herein.

FIG. 3 is a flow diagram illustrating an example of a touch object recognition process 48 according to one embodiment. The touch object recognition process 48 is configured to detect when a touch object on the sense array 18 is a passive stylus and not another type of touch object, such as a user's hand. The touch object recognition process 48 is executed by the electronic system 10 of electronic device 4.

In a first step 50, sense signals are received from sense elements of the sense array 18 in response to a touch object being on the sense array 18. As previously discussed, in one embodiment, the sense signals generated from the sense elements are electrical signals, such as capacitance signals, voltage signals, or current signals. In one embodiment, the sense signals are received by the processing device 12.

In a subsequent step 52, three sense signals from three respective sense elements are selected from the sense signals received in step 50. In one embodiment, one of the three sense signals selected is the largest sense signal, or maxima, of the sense signals received in step 50. In the same or another embodiment, the three sense signals are selected based on the physical position of their corresponding sense elements. For example, the three sense signals may be selected from sense elements that are positioned immediately adjacent to each other; are aligned in a single row, column, or diagonal; and/or are positioned within the edge portion 8 of the touch screen 6.

In a subsequent step 54, it is determined whether a sum of the strengths of the selected signals $S_1$, $S_2$, and $S_3$ is within a passive stylus strength range. The passive stylus strength range defines a range within which the sum of the strengths of the selected signals $S_1$, $S_2$, and $S_3$ must be to be considered a passive stylus. In one embodiment, the determination of step 54 is defined by equation 1, as follows:

$$\text{lower threshold} < S_1 + S_2 + S_3 < \text{upper threshold} \quad (1)$$

where $S_1$, $S_2$, and $S_3$ are the strengths of the selected signals, and the upper threshold is larger than the lower threshold.

The signal strengths $S_1$, $S_2$, and $S_3$ may be defined by a differential count from a reference value; an electrical value, such as capacitance, voltage, or current; or any other method known or later developed. In one embodiment, the signal strengths $S_1$, $S_2$, and $S_3$ are measured by the sensor 38.

In one embodiment, the lower and upper thresholds are based on a mass or weight of a passive stylus known or likely to be used. A large or heavy passive stylus will likely generate stronger sense signals than a small or light passive stylus. Accordingly, lower and upper thresholds for a large or heavy passive stylus may be set higher than lower and upper thresholds for a small or light passive stylus.

In the same or another embodiment, the lower and upper thresholds are based on a size of a tip of a passive stylus known or likely to be used. A passive stylus with a large tip will likely generate stronger sense signals than a passive stylus with a small tip. Thus, the lower and upper thresholds for a passive stylus with a large tip may be set higher than lower and upper thresholds for a passive stylus with a small tip.

If the sum of the strengths of the selected signals $S_1$, $S_2$, and $S_3$ is not within the passive stylus strength range in step 54, the touch object recognition process 48 moves to step 56, where it is determined that the touch object is not a passive stylus. If the sum of the strengths of the selected signals $S_1$, $S_2$, and $S_3$ is within the passive stylus strength range in step 54, the touch object recognition process 48 moves to step 58.

In step 58, it is determined whether the sum of the strengths of the selected signals $S_1$, $S_2$, and $S_3$ is less than a passive stylus threshold. The passive stylus threshold is a threshold value that the sum of the strengths of the selected signals $S_1$, $S_2$, and $S_3$ must be less than, to be considered a passive stylus. In one embodiment, the determination of step 58 is defined by equation 1, as follows:

$$S_1 + S_2 + S_3 < a * S_2 \quad (2)$$

where a is a first tuning parameter.

In some embodiments, steps 54 and 58 may be combined and the stylus detection may be performed based on either one or both of equations 1 and 2. For example, step 54 that uses equation 1 may be omitted and only step 58 that uses equation 2 may be performed; step 54 may be omitted and modified step 58, which uses both equations 1 and 2, may be performed; or "No" arrow from step 54 may lead to step 62 instead of to step 56.

In one embodiment, the sense element corresponding to the strength $S_2$ is positioned or interposed between the sense element corresponding to the strength $S_1$ and the sense element corresponding to the strength $S_3$. In the same or another embodiment, the sense element corresponding to the strength $S_2$ is the largest sense signal, or maxima, of the sense signals received in step 50.

In one embodiment, the value of the tuning parameter a is based on a position of the touch object relative to the sense elements. For example, if it is assumed that the touch object is positioned in a center of a sense element, instead of between two adjacent sense elements, a may be equal to 1.66 or 2.4.

Figure 4A:
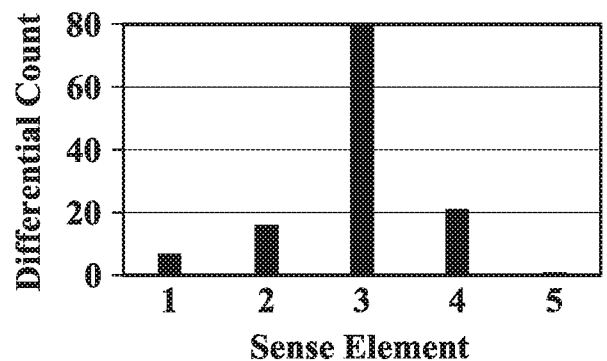
FIG. 4A is a diagram illustrating an example of a response of sense elements when a passive stylus is on a touch screen.
Figure 4B:
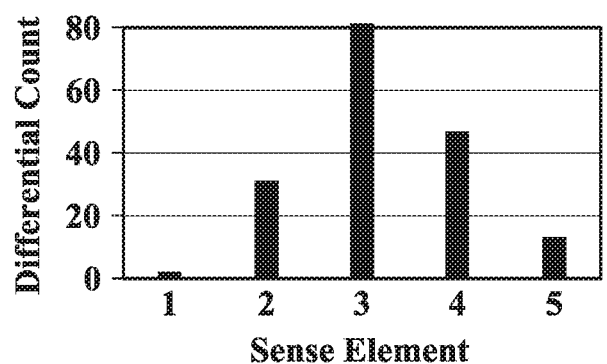
FIG. 4B is a diagram illustrating an example of a response of sense elements when a user's hand is on a touch screen.

Equation 2 was derived from the observation that sense signals surrounding a maxima sense signal are typically lower when a touch object is a passive stylus. For example, FIG. 4A is a diagram illustrating an example of a response of sense elements when a passive stylus is on a touch screen. FIG. 4B is a diagram illustrating an example of a response of sense elements when a user's hand is on a touch screen. Five sense elements are shown on the x-axes of FIGS. 4A and 4B. The strengths of sense signals generated by the five sense elements are shown on the y-axes of FIGS. 4A and 4B. As previously discussed, the signal strengths may be defined by a differential count from a reference value; an electrical value, such as capacitance, voltage, or current; or any other method known or later developed. In the embodiment shown in FIGS. 4A and 4B, the signal strengths are defined by differential counts from a reference value.

When comparing FIGS. 4A and 4B, it can be seen that the strengths of signals surrounding a maxima sense signal, which in this case is the sense signal generated by sense element 3, are generally lower when a touch object is a passive stylus. Namely, the differential counts of sense elements 1, 2, ef4, and 5 of FIG. 4A are generally lower than the differential counts of sense elements 1, 2, 4, and 5 of FIG. 4B. This may be explained, in part, by a user's hand, or more specifically a user's finger, being wider than a tip of a passive stylus, and, thus, having greater contact with more sense elements.

If the sum of the strengths of the selected signals $S_1$, $S_2$, and $S_3$ is less than the passive stylus threshold in step 58, the touch object recognition process 48 moves to step 60, where it is determined that the touch object is a passive stylus. If the sum of the strengths of the selected signals $S_1$, $S_2$, and $S_3$ is not less than the passive stylus threshold in step 58, the touch object recognition process 48 moves to step 62.

Unfortunately, if the touch object is not within a center of one of the sense elements, the touch object recognition process 48 may fail to detect the touch object as a passive stylus. To minimize such detection failures, in step 62, it is determined whether the touch object is positioned in a center, instead of between two adjacent sense elements, of one of the sense elements corresponding to the selected signals. In one embodiment, it is determined that the touch object is positioned in a center of one of the sense elements by utilizing equations 3 and 4, as follows:

$$S_2+S_3>b*S_1 \text{ for } S_1<S_3 \tag{3}$$

$$S_1+S_2>b*S_3 \text{ for } S_1 \geq S_3 \tag{4}$$

where b is a second tuning parameter. In one embodiment, the tuning parameter b is larger than the first tuning parameter a. In the same or another embodiment, the tuning parameter b is equal to 5. When equations 3 and 4 are satisfied, it is determined that the touch object is in a center of one of the sense elements.

If it is determined that the touch object is positioned in a center of a sense element in step 62, the touch object recognition process 48 moves to step 60, where it is determined that the touch object is a passive stylus. If it is determined that the touch object is not positioned in a center of a sense element in step 62, the touch object recognition process 48 moves to step 56, where it is determined that the touch object is not a passive stylus.

Figure 5A:
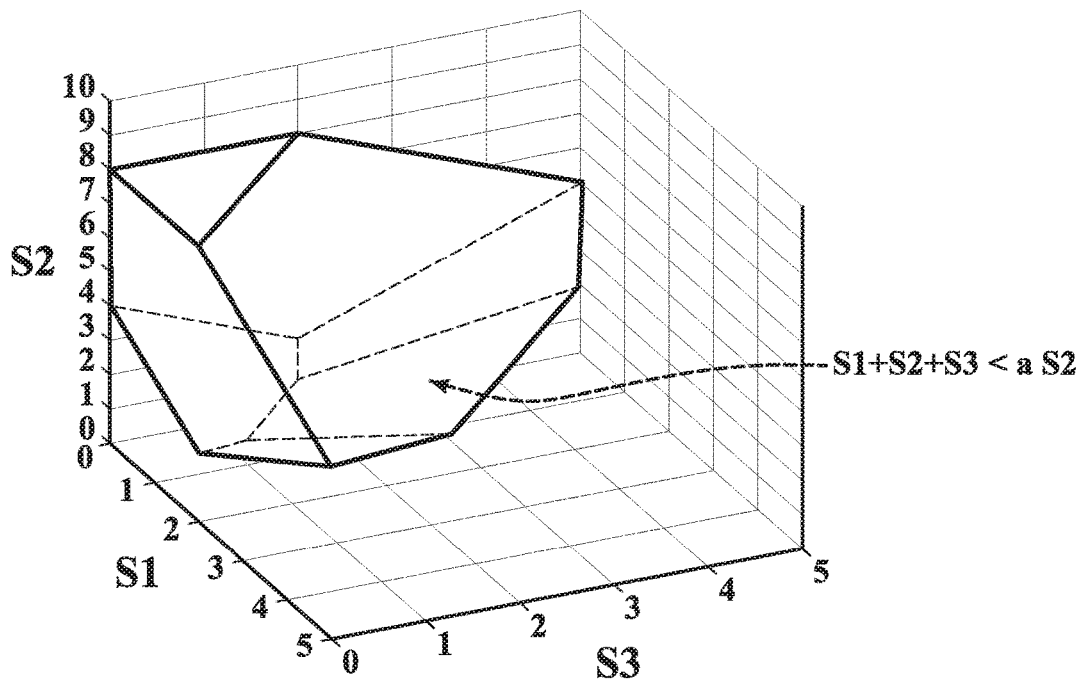
FIGS. 5A and 5B are diagrams illustrating an example of feature spaces for a touch object recognition process according to embodiments disclosed herein.
Figure 5B:
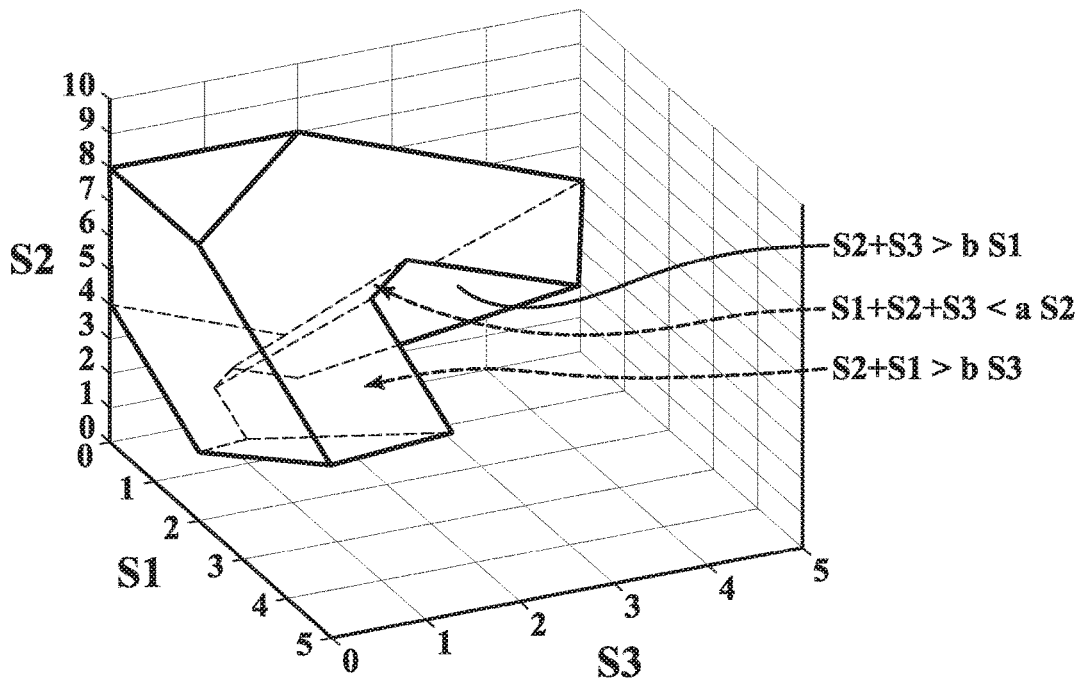

FIG. 5A is a diagram illustrating an example of a feature space based on equation 2 according to one embodiment. FIG. 5B is a diagram illustrating an example of a feature space based on equations 2, 3, and 4 according to one embodiment. When comparing FIGS. 5A and 5B, it can be seen that the determination of step 62 reduces the feature space in which the touch object will be determined as a passive stylus. Accordingly, the number of detection failures may be minimized.

In one embodiment, in response to determining that the touch object is a passive stylus in step 60, a procedure or algorithm for a passive stylus is executed by the electronic device 4. For example, a passive stylus menu may be displayed by the electronic device 4, marks corresponding to detected movements by the passive stylus may be displayed by the electronic device 4, or a variety of other types of responses may be performed.

In one embodiment, the touch object recognition process 48 also determines whether a verification condition is satisfied when it is determined that the touch object is positioned in a center of a sense element (i.e., equations 3 and 4 are satisfied) in step 62. The verification condition provides an additional verification to ensure that the touch object is a passive stylus. The verification condition is defined by the following equation, hereinafter referred to as equation 5:

$$LM_{coef}*S_2>SIDE_{coef}*(S_1+S_3) \tag{5}$$

where $LM_{coef}$ and $SIDE_{coef}$ are coefficients. In one embodiment, it is assumed that a passive stylus will have a tip size between 1 mm and 1.5 mm, and the sense elements will have a pitch size between 4 mm and 5 mm. In this embodiment, $LM_{coef}$ is equal to 2 and $SIDE_{coef}$ is equal to 3.

If the verification condition (i.e., equation 5) is satisfied, the touch object recognition process 48 moves to step 60, where it is determined that the touch object is a passive stylus. If the verification condition is not satisfied, the touch object recognition process 48 moves to step 56, where it is determined that the touch object is not a passive stylus.

The verification condition was derived through observation of a passive stylus strength ratio. In one embodiment, the passive stylus strength ratio is defined by equations 6 and 7, as follows:

$$\text{passive stylus strength ratio} = \frac{S_2+S_3}{S_1} \tag{6}$$

if $$S_3 > S_1$$

$$\text{passive stylus strength ratio} = \frac{S_2+S_1}{S_3} \tag{7}$$

if $$S_1 > S_3$$

Figure 6:
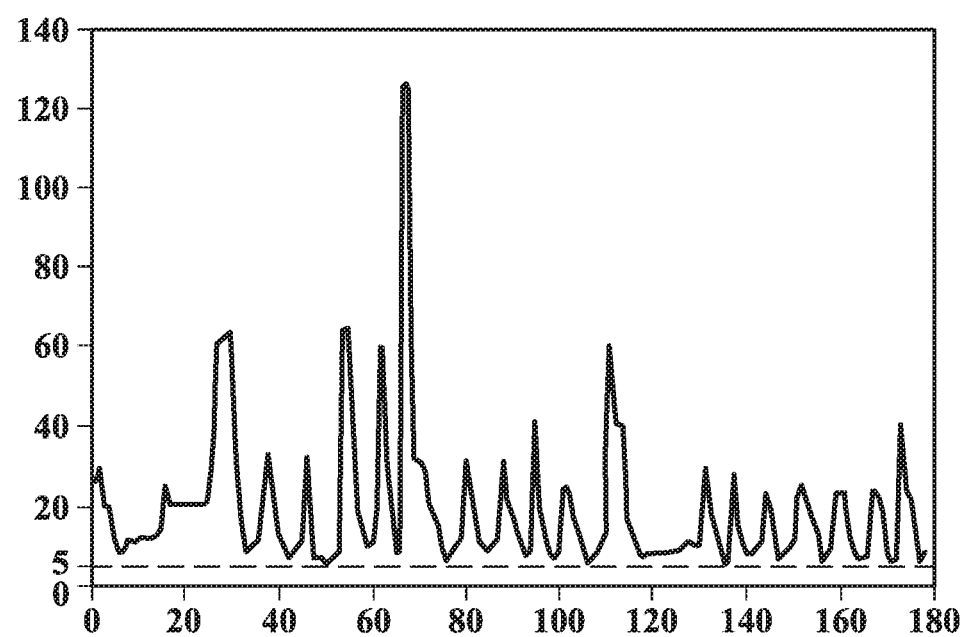
FIG. 6 is a diagram illustrating an example of a passive stylus strength ratio in response to a passive stylus moving along an edge portion of a touch screen according to embodiments disclosed herein.

FIG. 6 is a diagram illustrating an example of the passive stylus strength ratio in response to a passive stylus having a tip size of 1 mm moving along an edge portion of a touch screen having a pitch size of 4.2 mm. As shown in FIG. 6, the passive stylus strength ratio fluctuates between 6 and 20 but remains above 5.

In accordance with one or more embodiments, the touch object recognition process 48 provides object recognition that is capable of differentiating between a passive stylus and another type of touch object, such as a user's hand, on a touch screen, including along the edges of the touch screen. Experimental results have shown a 100% detection rate for a passive stylus having a 1 mm tip size; a 100% detection rate for large portions of a user's hand, such as a palm; and a 98% detection rate for a finger having a tip size of 4 mm. The false detections for the finger having a tip size of 4 mm may be explained, in part, by the finger having a shape similar to a passive stylus.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stylus sensor comprising:
reception circuitry which receives three signals having signal strengths S1, S2 and S3 from three sense elements respectively corresponding to three positions indicated by an object in an edge portion of a sensor array having a plurality of sensor elements in rows and columns, wherein the position corresponding to S2 is interposed between the positions corresponding to S1 and S3; and
a processor coupled to the reception circuitry which, in operation
(a-i) determines the object as a stylus if S1+S2+S3 is less than a defined threshold value;
(a-ii) determines the object as a stylus if S1+S2+S3 is not less than the defined threshold value and if the object is positioned in a center of one of the three sense elements; and
(b) determines the object as not a stylus if S1+S2+S3 is not less than the defined threshold value and if the object is not positioned in a center of one of the three sense elements.

2. The stylus sensor of claim 1, wherein the processor determines the object is positioned in the center of one of the three sense elements if:

$$S_2+S_3 > b*S_1 \text{ for } S_1 < S_3$$

$$S_1+S_2 > b*S_3 \text{ for } S_1 \geq S_3$$

where b is a tuning parameter.

3. The stylus sensor of claim 2, wherein b is 5.

4. An object sensing method comprising:
receiving three signals having signal strengths S1, S2 and S3 from three sense elements respectively corresponding to three positions indicated by an object in an edge portion of a sensor array having a plurality of sensor elements in rows and columns, wherein the position corresponding to S2 is interposed between the positions corresponding to S1 and S3; and
(a-i) determining the object as a stylus if S1+S2+S3 is less than a defined threshold value;
(a-ii) determining the object as a stylus if S1+S2+S3 is not less than the defined threshold value and if the object is positioned in a center of one of the three sense elements; and
(b) determining the object as not a stylus if S1+S2+S3 is not less than the defined threshold value and if the object is not positioned in a center of one of the three sense elements.

5. The method of claim 4, wherein the determining step includes determining the object is positioned in the center of one of the three sense elements if:

$$S\_2+S\_3 > b*S\_1 \text{ for } S\_1 < S\_3$$

$$S\_1+S\_2 > b*S\_3 \text{ for } S\_1 \geq {}_S3$$

where b is a tuning parameter.

6. The method of claim 5, wherein b is 5.

* * * * *

UNITED STATES PATENT AND TRADEMARK OFFICE
CERTIFICATE OF CORRECTION

Page 1 of 1

PATENT NO. : 10,095,347 B2
APPLICATION NO. : 15/233713
DATED : October 9, 2018
INVENTOR(S) : Oleksiy Savitskyy et al.

It is certified that error appears in the above-identified patent and that said Letters Patent is hereby corrected as shown below:

In the Claims

Column 10, Line 38 Claim 5:
"$S\_2+S\_3>b*S\_1$ for $S\_1\geq$ S3" should read, --$S2+S3>b*S1$ for $S1<S3$--.

Column 10, Line 40 Claim 5:
"$S\_1+S\_2>b*S\_3$ for $S\_1\geq$ s3" should read, --$S1+S2>b*S3$ for $S1\geq S3$--.

Signed and Sealed this
Twenty-sixth Day of February, 2019

Andrei Iancu
*Director of the United States Patent and Trademark Office*